United States Patent [19]
Beiter et al.

[11] 4,052,354
[45] Oct. 4, 1977

[54] AQUEOUS ANTIFOULING COATING COMPOSITION COMPRISED OF EMULSIFIED WATER-INSOLUBLE POLYMER AND TRIPHENYLTIN DERIVATIVE

[75] Inventors: Charles B. Beiter, Carteret; Lee A. Hafner, Edison, both of N.J.

[73] Assignee: M&T Chemicals Inc., Greenwich, Conn.

[21] Appl. No.: 355,405

[22] Filed: Apr. 30, 1973

[51] Int. Cl.$^2$ .................. C08L 31/00; C09D 5/14; C08L 31/02
[52] U.S. Cl. ..................... 260/29.6 M; 106/15 R; 260/29.6 MM
[58] Field of Search ............ 260/29.6 M, 29.6 MM; 106/15 AF, 15 R

[56] References Cited
U.S. PATENT DOCUMENTS

| | | | |
|---|---|---|---|
| 2,957,785 | 10/1960 | Featherland | 106/15 AF |
| 2,970,923 | 2/1961 | Skarmann et al. | 106/15 AF |
| 3,331,693 | 7/1967 | Taylor | 260/29.6 MM |

*Primary Examiner*—Joseph L. Schofer
*Assistant Examiner*—Peter F. Kulkosky
*Attorney, Agent, or Firm*—Robert P. Auber; Kenneth G. Wheeless; Robert Spector

[57] ABSTRACT

Aqueous coating compositions that inhibit the attachment and growth of barnacles and other fouling organisms on submerged surfaces are comprised at least in part of an emulsified film-forming, water-insoluble polymer, an effective amount of a triphenyltin derivative and water. Pigments, fillers, dispersing acids for the pigment and surface tension modifiers may also be present in addition to other conventional aqueous latex paint additives.

2 Claims, No Drawings

AQUEOUS ANTIFOULING COATING COMPOSITION COMPRISED OF EMULSIFIED WATER-INSOLUBLE POLYMER AND TRIPHENYLTIN DERIVATIVE

BACKGROUND

Various compositions have been used to coat surfaces exposed to a marine environment, particularly the submerged portions of ocean-going vessels, for the purpose of inhibiting the attachment and growth of barnacles, algae and other organisms responsible for fouling. These compositions usually consist, at least in part, of a film-forming polymer, an organic liquid in which the film-forming polymer is dissolved or dispersed and a toxicant for controlling the fouling organisms. One of the most effective classes of toxicants are triorganotin derivatives of the general formula $R_3SnX$ or $(R_3Sn)_2Y$ wherein R represents a hydrocarbon radical, preferably an alkyl radical containing 3 or 4 carbon atoms, and X and Y represent a monovalent and divalent anionic radical, respectively. Bis(tri-n-butyltin) oxide and tributyltin fluoride are illustrative of preferred toxicants.

Recently there has been a trend toward replacing the organic liquids present in prior art antifouling coating compositions with water, which does not present the hazards of flammability and toxicity associated with preparing and applying coating compositions containing organic liquids such as hydrocarbons and ketones as the sole or major solvent for the film-forming polymer. The personnel who apply compositions containing organic solvents are usually required to wear special clothing and respiratory devices to avoid accidental poisoning. In addition, the volatilization of the organic liquid that occurs during drying of the coatings introduces significant amounts of pollutants into the atmosphere. The hazards associated with using coating compositions containing organic solvents increase markedly when the compositions are applied in the form of finely divided sprays, as has become the practice in many shipyards. The use of aqueous compositions has eliminated or at least significantly reduced the flammability and toxicity of organic solvent-containing prior art coating formulations. One disadvantage of aqueous antifouling coating compositions is that they are not compatible with many of the effective triorganotin compounds employed as toxicants in non-aqueous compositions. Addition of the most widely used tripropyltin- and tributyltin compounds, including the halides and oxides, to the aqueous coating compositions usually results in coagulation of the emulsified film-forming polymer, with the result that the composition can no longer be used as a coating material.

One objective of the present invention is to reduce or eliminate many of the hazards, including toxicity and flammability, associated with non-aqueous antifouling coating compositions without sacrificing the effectiveness of these compositions in combating barnacles and other organisms responsible for fouling.

A second objective of this invention is to provide stable, non-flammable aqueous coating compositions that contain at least one triorganotin compound which will inhibit the attachment and growth of fouling organisms.

These objectives, together with others discussed in the following specification, can be achieved using aqueous coating compositions containing an emulsified water insoluble film-forming polymer and an effective amount of a triorganotin compound wherein the hydrocarbon radicals bonded directly to the tin atom are phenyl radicals which may contain one or more inert substituents.

SUMMARY OF THE INVENTION

This invention provides an improved coating composition for inhibiting the attachment and growth of fouling organisms, said coating composition being comprised, at least in part, of an emulsified water insoluble film-forming polymer, a liquid carrier and, as the toxicant, an effective amount of a triorganotin compound, wherein the improvements reside in 1. the presence of a liquid carrier wherein water is the major constituent, and
2. the presence of a triorganotin compound exhibiting a general formula selected from the group consisting of $R_3SnY$ and $(R_3SN)_2Z$ wherein R represents a phenyl radical or an inertly substituted phenyl radical, Y represents a monovalent anionic radical selected from the group consisting of halogen, nitrate, hydroxyl, and radicals derived by removal of the hydrogen atom from the carboxy radical

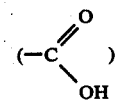

of a caboxylic acid containing between 1 and 20 carbon atoms, inclusive, and Z represents oxygen, sulfur or a sulfate radical.

DETAILED DESCRIPTION OF THE INVENTION

Stable aqueous coating compositions can be prepared using an effective amount, i.e. between 5 and 50%, based on the weight of said composition of triorganotin compounds wherein the three hydrocarbon radicals bonded to the tin atom are phenyl radicals. One or more of the hydrogen atoms present on the phenyl radicals can be replaced by substituents which do not adversely affect either the stability of the coating composition, by causing it to coagulate or the antifouling performance of the final coating. Suitable substituents include but are not limited to hydrocarbon radicals containing between 1 and 12 carbon atoms, including alkyl, cycloalkyl, aryl, aralkyl and alkaryl radicals, alkoxy and aryloxy radicals, halogen atoms, amino, cyano and isocyanate radicals.

The fourth radical bonded to the tin atom, represented by Y in the foregoing general formula, is selected from organic and inorganic anionic radicals including halogen, hydroxyl and carboxylate

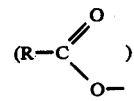

radicals wherein R represents a monovalent hydrocarbon radical containing between 1 and 20 carbon atoms. Anionic radicals other than the ones specified should be useful, since it has been demonstrated that the anionic portion of a triorganotin compound has no appreciable effect upon the biological activity of the compound so long as the anion itself does not exhibit significant biological activity. Z represents oxygen, sulfur or a sulfate radical The coating compositions of this invention contain between about 8 and 40%, based on the total weight of said composition, of an emulsified film-forming polymer. To be useful as a vehicle for an antifouling paint, the polymer should be resistant to either solubilization or softening by sea water, since any disruption in continuity of the coating applied on the surface to be protected would seriously impair the antifouling properties of the coating. Acrylic polymers are the preferred film-forming material. These polymers are derived from one or more esters of acrylic and methacrylic acids with alcohols containing between 1 and 12 carbon atoms. Optimum combinations of monomers are determined by properties such as brittleness, permeability and solubility which are desired in the final coating. In addition to resisting softening by sea water to the extent that film continuity is destroyed the polymer should be sufficiently porous to allow a gradual migration of triorganotin compound from the interior to the surface of the coating to replace that portion of the compound which is dissolved or otherwise removed by the surrounding water. Alternatively, by selecting an optimum degree of coating hardness and solubility it is possible to control the rate at which the surface of the coating is eroded away by the sea water, thereby bringing the underlying layers of the coating and triorganotin compound dispersed therein into contact with the sea water. Selecting the proper monomer or monomers required to achieve a particular combination of properties is readily accomplished using data available in the polymer chemistry literature.

The properties of the film-forming polymer can be modified by employing copolymers of one or more esters of acrylic or methacrylic acid with monomers yielding homopolymers of relatively low second order transition temperatures, such as vinyl acetate.

The film-forming polymer is conveniently prepared by an emulsion polymerization of the desired monomer(s) in an aqueous medium and in the presence of a suitable free radical source and emulsifier. The techniques, reaction conditions and theory of emulsion polymerization are extensively described in the literature, e.g. the text "Principles of Polymer Chemistry" by Paul J. Flory, published by Cornell University Press (1953). A detailed discussion of the subject in this specification is therefore not required.

In addition to the aqueous carrier, emulsified film-forming polymer and triphenyltin derivative, the antifouling compositions of this invention may contain between 0 and 40%, based on the weight of the composition, of a pigment. Titanium dioxide is a preferred pigment because of its high degree of "hiding power", i.e. the ability to render the coating opaque at relatively low concentrations. Other pigments such as iron oxide can be employed to impart color to the formulation. Other additives which may also be present in the paint formulation include anti-microbial agents for preserving the paint against attack by organisms such as mildew while the paint is stored in a container, in addition to wetting agents and surface tension depressants to facilitate application of the composition and dispersing of the pigment. Suitable wetting agents include reaction products of ethylene oxide polymers with phenols or ethers of these phenols. The total of these additives other than the pigment is equal to between 0.11 and 11% by weight of the composition, as required to optimize the desired properties of the composition.

The aqueous carrier for the present compositions may contain from negligible amounts up to 50% by weight of water-miscible liquid organic compounds to facilitate incorporating the various components into the final paint formulation. Suitable organic compounds include alcohols, amides and ketones, all of which contain between 3 and 8 carbon atoms.

The present coating compositions are prepared by blending the emulsified film-forming polymer, aqueous carrier and triphenyltin compound together with the pigment and other additives to obtain a homogenous mixture. The blending can be accomplished by means of roller mills, ball mills or high-speed stirrers, all of which are conventionally employed in the manufacture of paints. The compositions contain between 30 and 75%, based on total weight, of non-volatile materials and exhibit a viscosity of 70 to 100 Krebs Units, measured using a Stormer viscometer. Coatings suitable for spraying exhibit a viscosity of 30 to 50 Krebs Units.

The following examples demonstrate preferred embodiments of the present coating compositions, and should not be interpreted as limiting the scope of the present invention with regard to composition of the coating materials or the methods for preparing and utilizing these materials.

In the following examples parts and percentages are by weight unless otherwise specified.

EXAMPLE 1

Five different coating formulations were prepared using the ingredients set forth in the following Table I. The procedure employed consisted of first combining all of the liquids with the exception of those listed under the heading "resin component". The solid materials were then gradually added to the rapidly stirred mixture of liquids and the resultant paste was blended by high speed stirring after which the resin component was added to obtain a coating composition which could be easily applied to the desired substrate.

Each of the foregoing compositions was blended with 12.75% by weight of the triphenyltin compounds specified in Table II. The antifouling performance of each formulation was evaluated by applying two coats of the formulation (each coat being between 5.1 and $6.4 \times 10^{-3}$ cm. thick) to both surfaces of an $8 \times 10$ inch ($20 \times 25$ cm.) rectangular steel panel which had previously been sand blasted to produce roughened surfaces. After the second coating had dried the panels were immersed in Biscayne Bay at Miami Beach, Florida. The conditions in this location are particularly conducive to the attachment and growth of fouling organisms. The panels were secured to a raft such that the top of the panel was 12 inches (30.4 cm.) below the waterline at all times.

The panels were withdrawn at monthly intervals, inspected and the antifouling performance rated by observing (a) the number of barnacles present and (b) the percent of the most fouled surface which was covered by algae and other fouling organisms, exclusive of barnacles. The results of this evaluation are summarized in Table II.

Coating compositions which do not contain a triorganotin compound would be completely covered by fouling organisms during the first one or two months of exposure.

TABLE I

| INGREDIENT (PARTS BY WEIGHT) | FORMULATION No. 1 | 2 | 3 | 4 | 5 |
|---|---|---|---|---|---|
| Water | 26.60 | 16.60 | 16.60 | 36.00 | 16.60 |
| A sodium salt of a polymeric carboxylic acid described in USP 3,428,452, column 4, (as a 25% aqueous solution) | 10.90 | 10.90 | 10.90 | 10.90 | 10.90 |
| Surfactant - a reaction product of the benzyl ether or octyl phenol and ethylene oxide (described in USP 3,428,452) | 2.20 | 2.20 | 2.20 | 2.20 | 2.20 |
| Defoaming agent - a liquid mixture of a soap, non-ionic wetting agents, and liquid petroleum hydrocarbons distributed by the Nopco Division of Diamond Shamrock Chemical Company as Nopco NXZ | 2.20 | 2.20 | 2.20 | 2.20 | 2.20 |
| Ethylene glycol | 22.20 | 22.20 | 22.20 | 22.20 | 22.20 |
| Hydroxyethyl cellulose (2.0% aqueous solution) | 84.30 | 84.30 | 84.30 | 84.30 | 84.30 |
| Titanium dioxide | 222.0 | 222.0 | 222.0 | 222.0 | 222.0 |
| Silica | 200.3 | 200.3 | 200.3 | 200.3 | 200.3 |
| Zinc Oxide | 6.70 | 6.70 | 6.70 | 6.70 | 6.70 |
| RESIN COMPONENT | | | | | |
| Rhoplex MV-1 (a 46% by weight aqueous emulsion of a copolymer containing ethyl acrylate, methyl methocrylate, and a small amount of a carboxylic acid-containing adhesion promotor supplied by Rohm and Haas) | 541.26 | 541.26 | 481.12 | 481.12 | 481.12 |
| WS - 24 (a 36% by weight aqueous solution of an acrylic acid polymer supplied by Rohm and Haas) | — | — | 152.56 | — | — |
| WS - 32 (a 22% by weight aqueous solution of a copolymer containing acrylic acid and supplied by Rohm and Haas) | — | 124.81 | — | — | 249.62 |
| Tributyl Phosphate | 3.00 | 3.00 | 3.00 | 3.00 | 3.00 |
| Nopco NXZ | 2.20 | 2.20 | 2.20 | 2.20 | 2.20 |
| Poly(vinyl pyrrolidone) | 24.46 | — | — | 48.92 | — |
| Ammonium Hydroxide | 1.00 | 1.00 | 1.00 | 1.00 | 1.00 |

TABLE II

| COATING FORMULATION | TRIPHENYLTIN COMPOUND | NUMBER OF BARNACLES /% OF PANEL COVERED BY OTHER FOULING ORGANISMS FOLLOWING N MONTHS OF EXPOSURE | | | | | |
|---|---|---|---|---|---|---|---|
| | | N= 1 | 2 | 3 | 4 | 5 | 6 |
| 1 | Triphenyltin Hydroxide | 0/1 | 0/3 | 0/4 | 0/5 | 0/6 | 0/6 |
| 2 | Triphenyltin Hydroxide | 0/1 | 0/2 | 0/3 | 0/4 | 0/8 | 0/4 |
| 3 | Triphenyltin Hydroxide | 0/1 | 0/1 | 0/2 | 0/10 | 0/10 | 0/3 |
| 4 | Triphenyltin Hydroxide | 0/1 | 0/2 | 0/2 | 0/3 | 0/3 | 0/3 |
| 4 | Triphenyltin Fluoride | 0/1 | 0/5 | 0/7 | 0/7 | 0/6 | 0/10 |
| 5 | Triphenyltin Fluoride | 0/0 | 0/4 | 0/5 | 0/8 | 10/6 | 10/6 |
| 5 | Triphenyltin Fluoride | 0/6 | 0/6 | 0/8 | 0/6 | 0/10 | 15/6 |
| 5 | Triphenyltin Hydroxide | 0/0 | 0/1 | 0/3 | 0/4 | 0/3 | 0/4 |

EXAMPLE 2

This example demonstrates the imcompatibility of the aqueous paint formulations of this invention with some triorganotin compounds that are conventionally employed as the active toxicant for antifouling coatings.

The paint formulation was prepared as described in Example 1 and exhibited the following composition, expressed in parts by weight:

| | |
|---|---|
| Water | 16.6 |
| Surfactant - Reaction product of the benzyl ether of octyl phenol with ethylene oxide (refer to Table I) | 10.9 |
| Defoaming agent (refer to Table I) | 2.2 |
| Ethylene glycol | 22.2 |
| Hydroxyethyl cellulose | 84.30 |
| Titanium dioxide | 222.0 |
| Silica | 200.30 |
| Zinc oxide | 6.70 |
| A mixture of tri-n-butyltin fluoride (98%) and the sodium salt of condensed naphthalene sulfonic acid (2%) | 150.0 |
| Resin Component | |
| Rhoplex MV-1 (refer to Table I) | 601.4 |
| Tributyl phosphate | 3.0 |
| Nopco NXZ (refer to Table I) | 2.0 |
| Ammonium hydroxide | 1.0 |

The freshly made formulation appeared to be an acceptable coating composition. Within 24 hours it had formed a semi-solid mass. By contrast, all of the formulations listed in Table I were stored for several months without any adverse effects.

What is claimed is:

1. A stable antifouling coating composition comprising
   a. a liquid carrier wherein between 50 and 100% by weight of said carrier is water, the remainder being selected from water-miscible liquid organic compounds;
   b. between 8 and 40%, based on the weight of said composition, of an emulsified water-insoluble film-forming polymer selected from the group consisting of homopolymers of acrylic acid, methacrylic acid and esters of acrylic and methacrylic acids wherein the alcohol residue of said ester contains between 1 and 12 carbon atoms, and copolymers of said acids and esters; and
   c. between 5 and 50%, based on the weight of said coating composition, of triorganotin compound wherein the three hydrocarbon radicals bonded to the tin atom are selected from the group consisting of phenyl radicals and inertly substituted phenyl radicals and the remaining valence of the tin atom is satisfied by a radical selected from the group consisting of halogen, nitrate, hydroxyl, radicals derived from removal of the hydrogen atom from the carboxy radical of a carboxylic acid containing between 1 and 20 carbon atoms, oxygen, sulfur and sulfate; and
   d. between 0 and 40%, based on the weight of said composition, of a pigment;
   the total of (a), (b), (c) and (d) constituting between 90 and 99.89% by weight of said composition, 0.11 to 10% being selected from the group consisting of anti-microbial agents, wetting agents and surface tension depressants, with the proviso that non-volatile materials constitute between 30 and 75% by weight of said composition.

2. The stable coating composition of claim 1 wherein the triorganotin compound is triphenyltin fluoride or triphenyltin hydroxide.

* * * * *